United States Patent
Jung et al.

(10) Patent No.: US 10,168,926 B2
(45) Date of Patent: Jan. 1, 2019

(54) METHOD OF OPERATING DATA STORAGE DEVICE AND METHOD OF OPERATING DATA PROCESSING SYSTEM INCLUDING SAME

(71) Applicant: SAMSUNG ELECTRONICS CO., LTD., Suwon-si, Gyeonggi-do (KR)

(72) Inventors: Myung Jin Jung, Yongin-si (KR); Sang Yoon Oh, Suwon-si (KR); Hyun Sik Yun, Hwaseong-si (KR); Hyun Jin Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 15/256,939

(22) Filed: Sep. 6, 2016

(65) Prior Publication Data
US 2017/0075600 A1 Mar. 16, 2017

(30) Foreign Application Priority Data
Sep. 10, 2015 (KR) .......................... 10-2015-0128407

(51) Int. Cl.
*G06F 3/06* (2006.01)
*G06F 12/02* (2006.01)

(52) U.S. Cl.
CPC .......... *G06F 3/0619* (2013.01); *G06F 3/0659* (2013.01); *G06F 3/0685* (2013.01); *G06F 12/0253* (2013.01); *G06F 2212/702* (2013.01)

(58) Field of Classification Search
CPC ............ G06F 12/0246; G06F 12/0253; G06F 2212/7205; G06F 3/0619; G06F 3/0685; G06F 3/0659; G06F 2212/702
See application file for complete search history.

(56) References Cited

U.S. PATENT DOCUMENTS

| | | | |
|---|---|---|---|
| 4,775,932 A | 10/1988 | Oxley et al. | |
| 6,892,212 B2 | 5/2005 | Shuf et al. | |
| 7,302,544 B2 | 11/2007 | Chung et al. | |
| 7,769,974 B2 | 8/2010 | Bhansali et al. | |
| 8,108,448 B2 | 1/2012 | Siegwart et al. | |
| 8,166,269 B2 | 4/2012 | Vengerov | |
| 8,200,889 B2 | 6/2012 | Kwon et al. | |
| 8,402,242 B2 | 3/2013 | Hu et al. | |
| 8,417,878 B2 | 4/2013 | Goss et al. | |
| 8,725,957 B2 | 5/2014 | Eleftheriou et al. | |
| 2010/0180145 A1* | 7/2010 | Chu ................... | G06F 12/0246 714/2 |
| 2010/0325351 A1 | 12/2010 | Bennett | |
| 2014/0059279 A1 | 2/2014 | He et al. | |
| 2014/0089569 A1 | 3/2014 | Pignatelli | |
| 2014/0281172 A1 | 9/2014 | Seo et al. | |
| 2015/0324284 A1* | 11/2015 | Kim .................... | G06F 12/0246 711/103 |

(Continued)

*Primary Examiner* — Hiep T Nguyen
(74) *Attorney, Agent, or Firm* — Volentine, Whitt & Francos, PLLC

(57) ABSTRACT

A method of operating a data storage device performing garbage collection in response to locality information for pages of a data block. The method includes acquiring mapping table information for the plurality of pages, and determining validity of each one of the plurality of pages while scanning mapping tables indicated by mapping table information associated with the plurality of pages.

20 Claims, 12 Drawing Sheets

(56) References Cited

U.S. PATENT DOCUMENTS

| | | | |
|---|---|---|---|
| 2016/0170648 A1* | 6/2016 | Kim ..................... | G06F 3/0604 |
| | | | 711/154 |
| 2016/0283401 A1* | 9/2016 | Virajamangala ...... | G06F 12/122 |
| 2016/0306590 A1* | 10/2016 | Kang .................... | G06F 3/0652 |
| 2018/0032279 A1* | 2/2018 | Davis ................... | G06F 3/0647 |

* cited by examiner

FIG. 4A — Active Block (410-1, blocks 410-11 through 410-18), 411, 412 Free Block FIG. 4B — Used Block (410-1A)

| DATA 1 | LPN 013 |
| DATA 2 | LPN 055 |
| DATA 3 | LPN 056 |
| DATA 4 | LPN 321 |
| DATA 5 | LPN 322 |
| DATA 6 | LPN 323 |
| DATA 7 | LPN 324 |
| DATA 8 | LPN 325 |

FIG. 4C — Victim Block (410-1B)

| DATA 1 | LPN 013 | Valid |
| DATA 2 | LPN 055 | Invalid |
| DATA 3 | LPN 056 | Invalid |
| DATA 4 | LPN 321 | Invalid |
| DATA 5 | LPN 322 | Invalid |
| DATA 6 | LPN 323 | Invalid |
| DATA 7 | LPN 324 | Valid |
| DATA 8 | LPN 325 | Valid |

FIG. 4D — Free Block (410-1C)

FIG. 4E — (410-3)

| DATA 1 | LPN 013 |
| DATA 7 | LPN 324 |
| DATA 8 | LPN 325 |

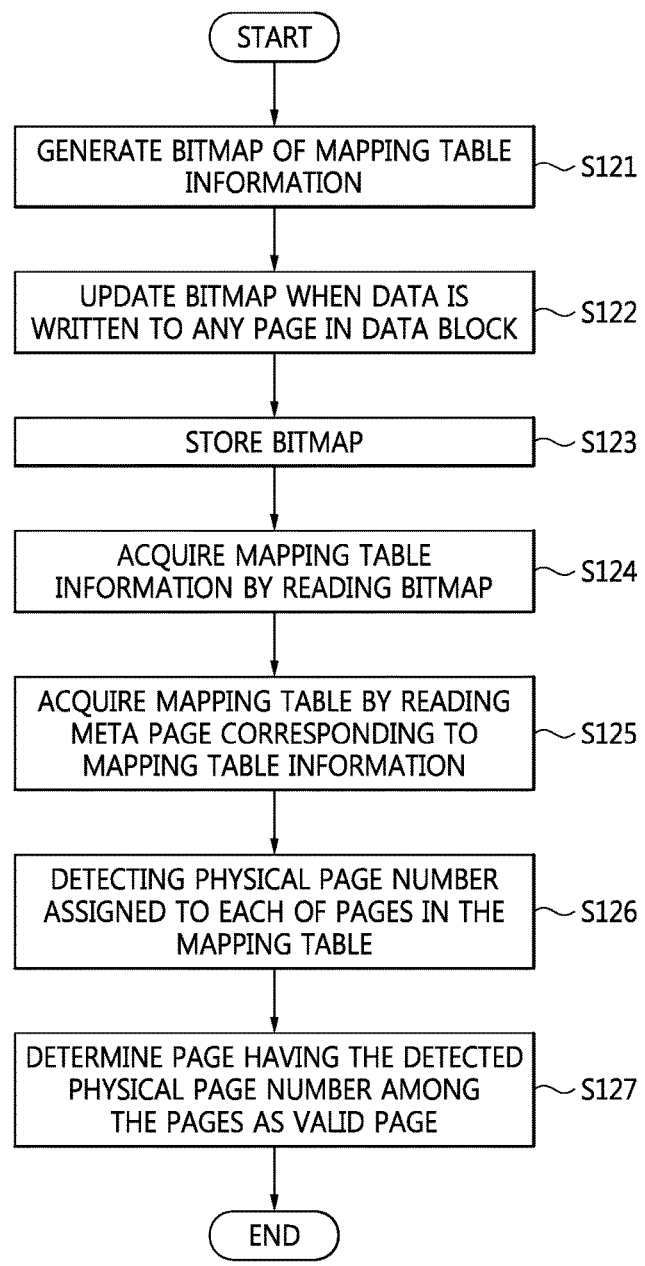

FIG. 10

| | 410-1E | |
|---|---|---|
| 410-11 | DATA 1 | LPN 013 |
| 410-12 | DATA 2 | LPN 055 |
| 410-13 | DATA 3 | LPN 056 |
| 410-14 | DATA 4 BITMAP X | LPN 321 #MAP 2/ INA, IND |
| 410-15 | DATA 5 | LPN 322 |
| 410-16 | DATA 6 | LPN 323 |
| 410-17 | DATA 7 | LPN 324 |
| 410-18 | DATA 8 BITMAP Y | LPN 325 #MAP 1/ IND |

Rows 410-11 through 410-14 are grouped as G1; rows 410-15 through 410-18 are grouped as G2.

METHOD OF OPERATING DATA STORAGE DEVICE AND METHOD OF OPERATING DATA PROCESSING SYSTEM INCLUDING SAME

CROSS-REFERENCE TO RELATED APPLICATION

This application claims priority under 35 U.S.C. § 119(a) from Korean Patent Application No. 10-2015-0128407 filed on Sep. 10, 2015, the disclosure of which is hereby incorporated by reference in its entirety.

BACKGROUND

Embodiments of the inventive concept relate to a method of operating a data storage device, and more particularly, to a method of operating a data storage device which performs more efficient garbage collection by referencing locality information. Other embodiments of the inventive concept relate to a method of operating a data processing system including this type of data storage device.

Many flash-based data storage devices are relatively resource poor. This poverty of resources results in relatively less information being stored than in data storage devices having more sufficient resources. When garbage collection is performed on the flash-based data storage device, the flash-based data storage device collects (e.g., reads) information from available resources (e.g., a buffer memory implemented using a dynamic random access memory) necessary to the performance of a garbage collection operation. Thus, garbage collection comes at a cost that may be significant.

As data stored in a flash-based data storage device increases and garbage collection is more frequently performed, the overall performance of the flash-based data storage device becomes increasingly dependent on the efficiency of the garbage collection operation(s). Therefore, optimization of garbage collection (i.e., reducing the cost of garbage collection by improving efficiency) is required in order to increase or even maintain the performance level of a resource-poor, flash-based data storage devices.

SUMMARY

According to some embodiments of the inventive concept, there is provided a method of operating a data storage device. The method includes; acquiring mapping table information for mapping tables associated with a plurality of pages of a data block, and determining validity for each page assigned to the mapping tables from among the plurality of pages while scanning the mapping tables.

In another aspect, the method includes; communicating a command from the host to the data storage device to perform garbage collection on a data block of a memory cell array of the data storage device, during the garbage collection, acquiring mapping table information for mapping tables stored in the data storage device and related to a plurality of pages of the data block, and determining validity for each page assigned to the mapping tables from among the plurality of pages while scanning the mapping tables.

In still another aspect, the method includes; determining a locality value for a data block of the memory cell array, wherein the data block includes a plurality of pages, comparing the locality value of the data block to a locality reference value to generate a comparison result, selecting a page validity determination method from a plurality of page validity determination methods in response to the comparison result, and using the selected page validity determination method to determine the validity of each one of the plurality of pages.

BRIEF DESCRIPTION OF THE DRAWINGS

The above and other features and advantages of the inventive concept will become more apparent by describing in detail exemplary embodiments thereof with reference to the attached drawings in which:

FIG. 4, inclusive of FIGS. 4A, 4B, 4C, 4D and 4E, is conceptual diagram further illustrating an approach in which a data block included in each of the logical storage regions illustrated in FIG. 2 is defined as different blocks;

FIG. 7 is a flowchart summarizing a method of determining validity of each of pages included in a data block having locality according to some embodiments of the inventive concept;

FIG. 10 is a diagram of a memory map which stores locality information of a data block according to some embodiments of the inventive concept;

DETAILED DESCRIPTION OF THE EMBODIMENTS

Figure 1:
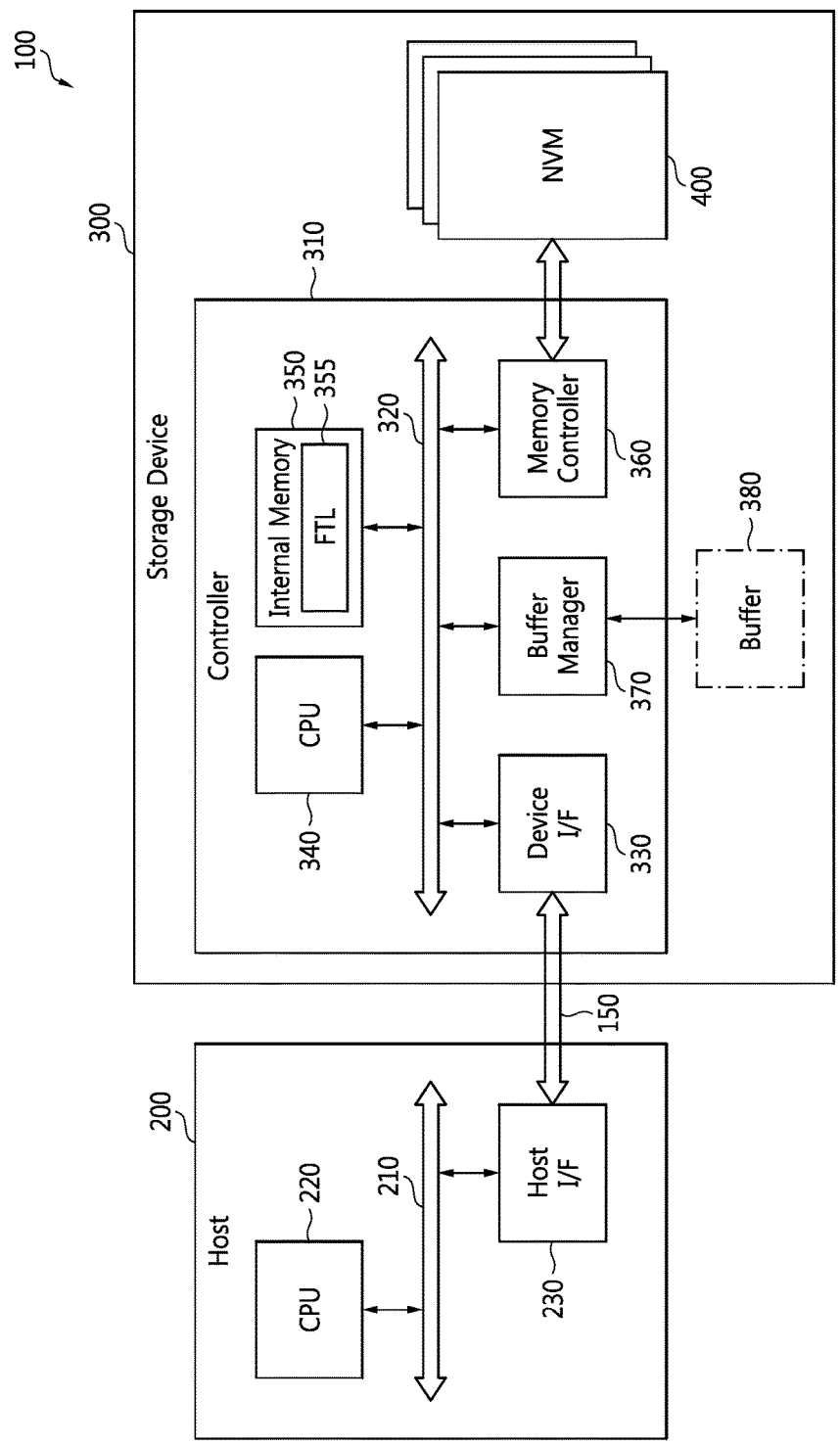
FIG. 1 is a block diagram illustrating a data processing system according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram illustrating a data processing system 100 according to some embodiments of the inventive concept. The data processing system 100 may include a host 200 and a data storage device 300 connected to the host 200 through an interface (I/F) 150.

The data processing system 100 may be implemented as a personal computer (PC), a desktop computer, a laptop computer, a workstation computer, or a mobile computing device, but it is not restricted thereto. The mobile computing device may be a cellular phone, a smart phone, a tablet PC, a personal digital assistant (PDA), an enterprise digital assistant (EDA), a digital still camera, a digital video camera, a portable multimedia player (PMP), a multimedia device, a personal navigation device or portable navigation device (PND), a handheld game console, a mobile internet device (MID), a wearable device (or a wearable computer), an internet of things (IoT) device, an internet of everything (IoE) device, or an e-book.

The I/F 150 may be implemented as a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), a NAND-type flash memory interface, or a multimedia card (MMC) interface, but the I/F 150 is not restricted to these examples. In this regard, I/F 150 may facilitate the communication (e.g., transmission) of electrical signals and/or optical signals.

The host 200 may control data processing operations (e.g., a write (or program) operation and a read operation) of the data storage device 300 through the I/F 150. The host 200 may be a host controller. The host 200 may be implemented as an integrated circuit (IC), a motherboard, an application processor (AP), or a system on chip (SoC), but it is not restricted to these examples.

A central processing unit (CPU) 220 may communicate a command and/or data using a host I/F 230 and a bus architecture 210. The block diagram of the host 200 illustrated in FIG. 1 is quite general, and those skilled in the art will understand that the host 200 may take many different, specific forms.

For example, the bus architecture 210 may be implemented as an advanced microcontroller bus architecture (AMBA), an advanced high-performance bus (AHB), an advanced peripheral bus (APB), an advanced extensible interface (AXI), an advanced system bus (ASB), or a combination thereof, but the bus architecture 210 is not restricted to these examples.

The CPU 220 may generate a write request controlling a write operation, or a read request controlling a read operation executed by the data storage device 300. The write request may include a write address and the read request may include a read address. The CPU 220 may include at least one processing core. Here, the write request and the read request may be implemented as respective commands.

The host I/F 230 of host 200 and/or device I/F 330 of the storage device 300 may cooperate to modify the format of a command, a response and/or data variously communicated between the host 200 and data storage device 300 via the I/F 150. That is, recognizing that the CPU 220 and/or bus architecture 210 may not issue commands and/or provide data directly compatible with the data storage device 300, or that the responses issued and/or data provided by the data storage device 300 may not be directly compatible with the host 200, the host I/F 230 and device I/F 330 may cooperate to may necessary changes to the commands, responses, and/or data. Accordingly, the host I/F 230 may include a transceiver configured to transmit/receive commands, responses and/or data. That is, the structure and operation of the host I/F 230 are configured to be compatible with those of the I/F 150.

The data storage device 300 may include a controller 310 and non-volatile memories (NVMs) 400. The data storage device 300 may optionally include a buffer 380. The data storage device 300 may store data provided by the host 200 using the NVMs 400 under the control of the controller 310. The data storage device 300 may be implemented as a flash-based memory device, but it is not restricted thereto. For instance, the data storage device 300 may be implemented as a smart card, a secure digital (SD) card, an MMC, an embedded MMC (eMMC), an embedded multi-chip package (eMCP), a perfect page NAND (PPN), a universal flash storage (UFS), a universal serial bus (USB) flash drive, a solid state drive (SSD), or an embedded SSD (eSSD), but the data storage device 300 is not restricted to these examples.

The controller 310 may control commands, responses and/or data communicated between the host 200 and NVMs 400. The controller 310 may be implemented in an IC or a SoC. The controller 310 may include bus architecture 320, a device I/F 330, a CPU 340, an internal memory 350, a memory controller 360, and a buffer manager 370. The bus architecture 320 may be implemented as AMBA, AHB, APB, AXI, ASB, or a combination thereof, but the bus architecture 320 is not restricted to these examples.

Consistent with the foregoing, the device I/F 330 may modify the format of a response and/or data to be communicated to the host 200 and may transmit the response and/or data in the modified format to the host 200 through the I/F 150. The device I/F 330 may also receive a command and/or data from the host 200, modify the format of the received command and/or data, and communicate the modified command and/or data to the CPU 340 and/or the buffer manager 370. The device I/F 330 may include a transceiver configured to transmit/receive commands, responses and/or data. That is, the structure and operation of the device I/F 330 are configured to be compatible with those of the I/F 150.

The CPU 340 may control the device I/F 330, internal memory 350, memory controller 360, and buffer manager 370 through the bus architecture 320. The CPU 340 may execute firmware (or programming code) that controls operation of the data storage device 300. Although one CPU 340 is illustrated in FIG. 1 for clarity of the description, the controller 310 may include a first CPU that processes a command and/or data provided by the host 200, and a second CPU that controls the various data access operations (e.g., write operations, read operations, and/or erase operations) with respect to the NVMs 400. Exemplary operation of the firmware or programming code executed by the CPU 340 will be described in some additional detail with reference to FIGS. 3, 4, 5 and 6 hereafter.

The internal memory 350 may store data necessary for, or generated by the execution of the various data access operations and related house-keeping operations by the controller 310. The internal memory 350 may be implemented as random access memory (RAM), dynamic RAM (DRAM), static RAM (SRAM), buffer, buffer memory, cache, or tightly couple memory (TCM), but the internal memory 350 is not restricted to these examples.

The internal memory 350 may store a flash translation layer (FTL) 355 loaded from at least one of the NVMs 400. The FTL 355 may be firmware configured to perform address mapping (or address translation), wherein a logical address provided by the host 200 is mapped to a corresponding physical address of the NVMs 400. As will be appreciated by those skilled in the art, the FTL 355 may also be configured to perform memory cell wear-leveling, and/or garbage collection.

The memory controller 360 may control data processing operations with respect to the NVMs 400 under the control of the CPU 340. When the NVMs 400 are implemented using flash memory, the memory controller 360 may serve as a flash memory controller. In this regard, the memory controller 360 may communicate various control signal(s) and/or data to the NVMs 400 using one or more data channels.

The memory controller 360 may also control garbage collection operation with respect to data blocks included in the NVMs 400. Accordingly, the memory controller 360 may manage mapping table information for data block(s) involved in garbage collection operations. The memory controller 360 may support a SATA interface, SATAe interface, SAS, PCIe interface, NVMe interface, AHCI, MMC interface, NAND-type flash memory interface, or NOR-type flash memory interface, but the inventive concept is not restricted to these examples.

The buffer manager 370 may be used during the writing of data to, and/or the reading of data from the buffer 380. The buffer 380 may be implemented using RAM, SRAM, or DRAM, but the inventive concept is not restricted to these examples.

The buffer 380 may store a mapping table for logical address-to-physical address translation for the NVMs 400 and a bitmap related to mapping table information regarding each of data blocks included in the NVMs 400. The bitmap may include a number of mapping tables and index information with regard to respective data block(s). In certain embodiments, the mapping table and bitmap may be updated using the FTL 355. The buffer 380 may serve as a cache that temporarily stores write data to be transmitted to the NVMs 400 during a written operation, and/or read data retrieved from the NVMs 400 during a read operation.

When the controller 310 and the buffer 380 are respectively formed in different semiconductor chips, the controller 310 and buffer 380 may be implemented in one package using such assembly techniques as package-on-package (PoP), multi-chip package (MCP), or system-in package (SiP). However, the inventive concept is not restricted to these examples.

The NVMs 400 may additionally be used to store an operation system (OS), various application programs, and various types of data. The respective NVMs 400 may include one or more memory cell array(s). Each of the NVMs 400 may be implemented in a semiconductor chip or a semiconductor package. At least one channel may be configured between the memory controller 360 and NVMs 400, where the at least one channel may include one or more transmission lines variously configured to communicate commands, responses and/or data. Thus, in certain embodiments, the NVMs 400 may be arranged according to a structure compatible with 'A' channels-by-'B' ways, where 'A' and 'B' are natural numbers.

The memory cell array(s) of the NVMs 400 may be implemented as a two-dimensional memory cell array or a three-dimensional memory array. The three-dimensional memory cell array may be monolithically formed at one or more physical levels in an array of memory cells having an active region disposed on or above a silicon substrate and may include a circuit related with the operation of the memory cells. The circuit may be formed in, on or above the silicon substrate. The term "monolithic" means that layers at each level in an array are directly deposited on layers at an underlying level in the array. The three-dimensional memory cell array may include a vertical NAND string which is vertically oriented so that at least one memory cell is placed on or above another memory cell. The at least one memory cell may include a charge trap layer.

Figure 2:
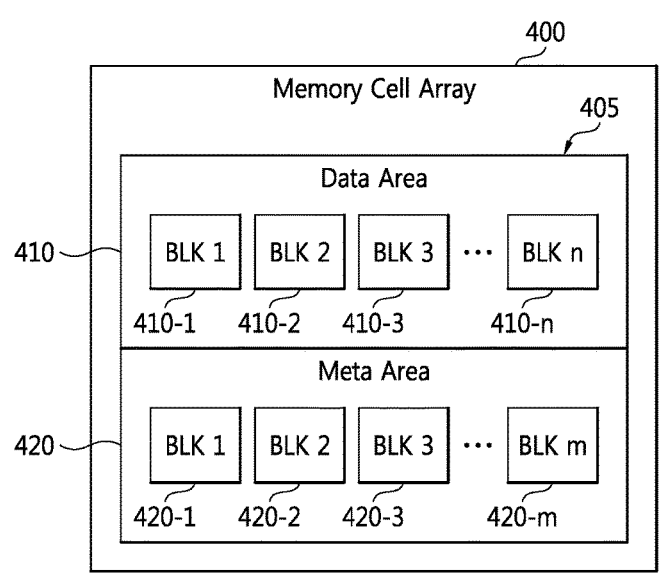
FIG. 2 is a block diagram of logical storage regions in non-volatile memory illustrated in FIG. 1.

FIG. 2 is a block diagram illustrating an example of logical storage regions in the NVMs 400 of FIG. 1. Referring to FIGS. 1 and 2, a logical storage region 405 of a NVM 400 may include a data area 410 and a meta area 420.

The data area 410 may be an area to which user data is written and the meta area 420 may be an area for storing information about data (e.g., the user data) stored in the data area 410. For instance, information about the name, size and logical address(es) of data stored in the data area 410 may be stored in the meta area 420. A mapping table used by the FTL 355 may also be stored in the meta area 420.

The data area 410 may include a plurality of data blocks 410-1 through 410-n, where 'n' is a natural number of at least 4. The meta area 420 may include a plurality of meta blocks 420-1 through 420-m, where 'm' is a natural number of at least 4. Here, 'n' may be equal to, or different from 'm'.

The data blocks 410-1 through 410-n and the meta blocks 420-1 through 420-m each may include a plurality of pages. Although each of the blocks 410-1 through 410-n and 420-1 through 420-m includes eight pages in the embodiments illustrated in FIGS. 4A, 4B, 4C, 4D and 4E (hereafter, inclusively denoted as FIGS. 4A through 4E), the inventive concept is not restricted to only this number of pages included in each block. Each page included in each of the meta blocks 420-1 through 420-*m* may be referred to as meta page.

It is assumed for illustrative purposes that an erase operation is performed on each block (or on a block basis), while write and read operations are performed on each page (or on a page basis) in the data storage device 300. Each page may be divided into a main area in which user data is stored and a spare area in which meta data is stored.

Figure 3:
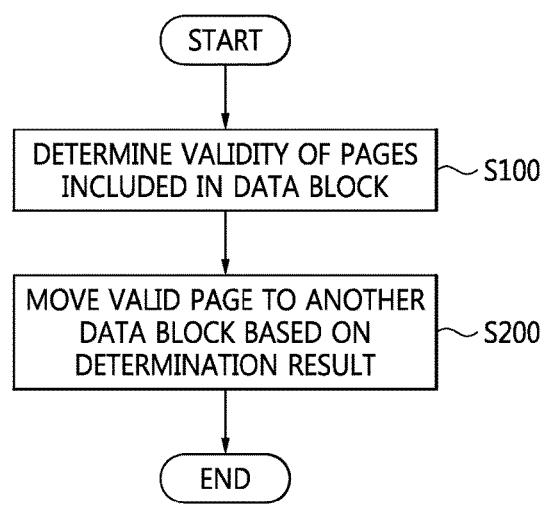
FIG. 3 is a flowchart of garbage collection according to some embodiments of the inventive concept.

FIG. 3 is a flowchart summarizing a garbage collection operation according to some embodiments of the inventive concept. FIGS. 4A through 4E are conceptual diagrams further illustrating an approach wherein a data block included in the logical storage region 405 illustrated in FIG. 2 is defined as different blocks. Referring collectively to FIGS. 1 through 4E, a first data block 410-1 of FIG. 4A is assumed to be an active block assigned for data to be written among free blocks in an erased state.

Referring to FIGS. 4A and 4B, data DATA1 through DATA8 transmitted from the host 200 may be written to pages 410-11 through 410-18 of the first data block 410-1, respectively, according to the control of the controller 310. Once the data DATA1 through DATA8 are stored in the respective pages 410-11 through 410-18, the first data block 410-1 may be defined as a used block 410-1A. Thereafter, perhaps as the result of subsequent data processing operations, the used block 410-1A may include an invalid page that cannot be read and a valid page that can be read.

The controller 310 may perform garbage collection according to a write command of the host 200 or at predetermined intervals. As shown in FIGS. 4B and 4C, the controller 310 may designate one block (e.g., block 410-1A) among the data blocks 410-1 through 410-*n* included in at least one of the NVMs 400 as a target block for garbage collection and another block (e.g., block 410-1B) among the data blocks 410-1 through 410-*n* included in at least one of the NVMs 400 as a victim block for garbage collection.

Thereafter, referring to FIGS. 4A and 4C, the controller 310 may determine the validity or invalidity of the pages 410-11 through 410-18 included in the victim block 410-1B (S100). In the example illustrated FIG. 4, inclusive of FIGS. 4A through 4E, and FIG. 3, it is assumed that pages 410-11, 410-17 and 410-18 are determined to be valid pages, and pages 410-12 through 410-16 are determined to be invalid pages. Accordingly, the controller 310 may move the data (i.e., DATA1, DATA7, and DATA8) respectively corresponding to the valid pages 410-11, 410-17, and 410-18 to a free block (e.g., block 410-3) in response to the page validity/invalidity determination result, as shown in FIGS. 4A, 4C, and 4E (S200).

Thereafter, referring to FIGS. 4C and 4D, the controller 310 may perform an erase operation on the entire victim block 410-1B. Accordingly, the victim block 410-1B may reallocated as a new free block 410-1C, as shown in FIG. 4D, where the free block 410-1C may subsequently be used as the active block 410-1, as shown in FIG. 4A.

Hereinafter, a method of determining validity/invalidity information (or method of determining validity) for at least one valid page in at least one data block during a garbage collection operation performed on the at least one data blocks will be described in some additional detail with reference to FIGS. 5 through 11.

Figure 5:
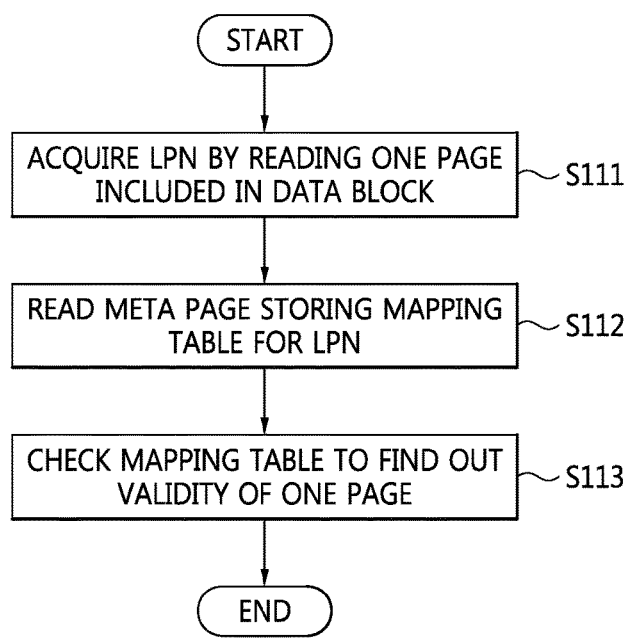
FIG. 5 is a flowchart summarizing a method of determining validity of each of pages included in a data block which does not have locality according to some embodiments of the inventive concept.
Figure 6:
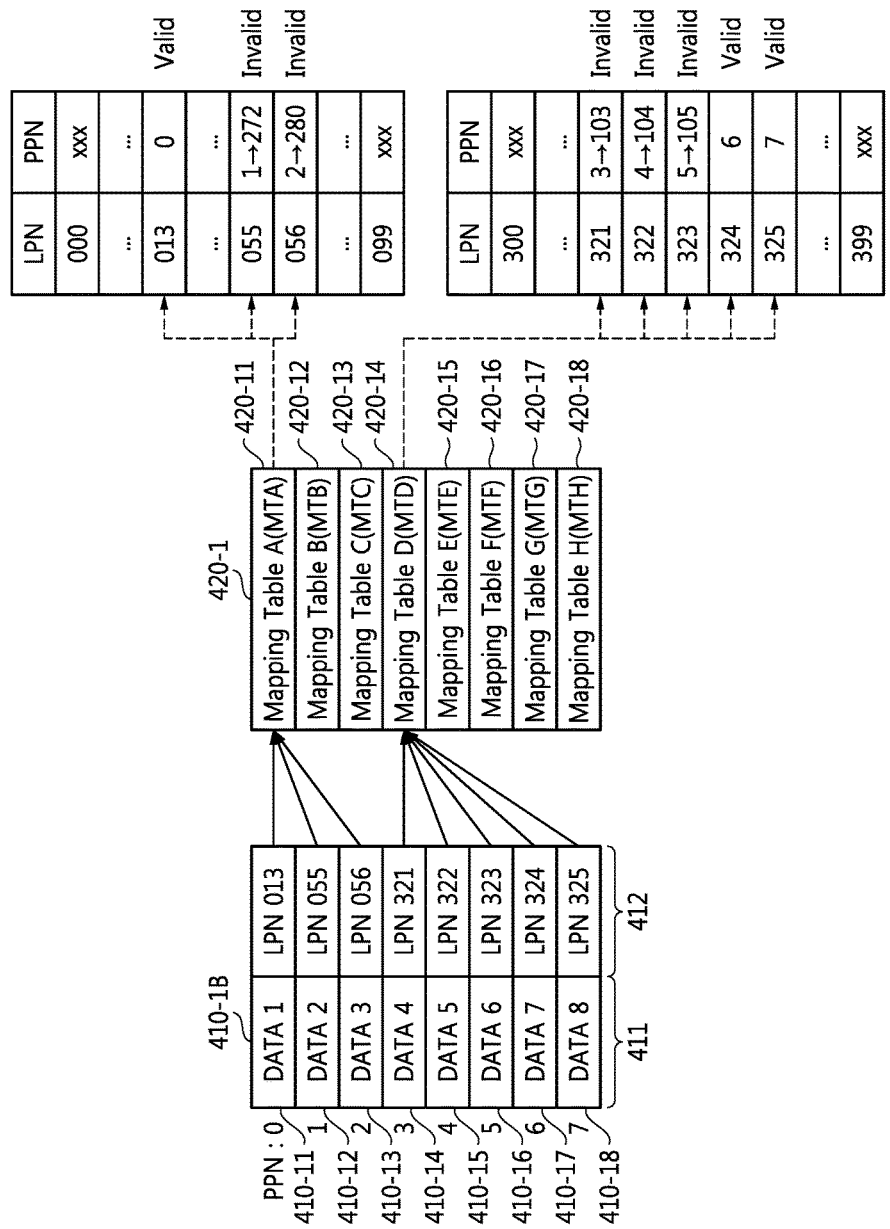
FIG. 6 is a conceptual diagram of an operation of a controller illustrate in FIG. 1 which determines validity of each of pages in a data block.

FIG. 5 is a flowchart summarizing a method of determining validity for one of a plurality of pages included in a data block having relatively low locality of stored data according to some embodiments of the inventive concept. FIG. 6 is a conceptual diagram further illustrating the operation of the controller 310 in FIG. 1 which may be used to determine validity of each of pages in a data block.

Referring to FIGS. 1, 5, and 6, the first data block 410-1B includes the first through eighth pages 410-11 through 410-18 having respective physical page numbers PPN assigned for each of the pages 410-11 through 410-18. For instance, physical page numbers PPN0 through PPN7 may be assigned to the first through eighth pages 410-11 through 410-18, respectively.

Thus, the data DATA1 through DATA8 received from the host 200 is stored in the pages 410-11 through 410-18, respectively, of the first data block 410-1. Corresponding logical page numbers LPN for each of the data DATA1 through DATA8 are also stored in a corresponding one of the pages 410-11 through 410-18. For instance, the first data DATA1 corresponding to a logical page number LPN013 may be stored in the first page 410-11; the second data DATA2 corresponding to a logical page number LPN055 may be stored in the second page 410-12; the third data DATA3 corresponding to a logical page number LPN056 may be stored in the third page 410-13; the fourth data DATA4 corresponding to a logical page number LPN321 may be stored in the fourth page 410-14; the fifth data DATA5 corresponding to a logical page number LPN322 may be stored in the fifth page 410-15; the sixth data DATA6 corresponding to a logical page number LPN323 may be stored in the sixth page 410-16; the seventh data DATA7 corresponding to a logical page number LPN324 may be stored in the seventh page 410-17; and the eighth data DATA8 corresponding to a logical page number LPN325 may be stored in the eighth page 410-18. The data DATA1 through DATA8 may be stored in a main area 411 and the logical page numbers LPN013, LPN055, LPN056, LPN321, LPN322, LPN323, LPN324, and LPN325 respectively corresponding to the data DATA1 through DATA8 may be stored in a spare area 412.

A meta block 420-1 may include first through eighth meta pages 420-11 through 420-18. A mapping table managed by the FTL 355 may be stored in each of the meta pages 420-11 through 420-18. The mapping table may include mapping information about logical page numbers LPN in a certain range. For instance, a mapping table MTA stored in the first meta page 420-11 may include mapping information about 100 logical page numbers LPN000 through LPN099 and a mapping table MTD stored in the fourth meta page 420-14 may include mapping information about 100 logical page numbers LPN300 through LPN399. Each of mapping tables MTB, MTC, MTE, MTF, MTG, and MTH respectively included in the meta pages 420-12, 420-13, and 420-15 through 420-18 may include 100 logical page numbers. Although each of the mapping tables MTA through MTH includes mapping information about 100 logical page numbers in the embodiments illustrated in FIG. 6, the inventive concept is not restricted to the number of logical page numbers included in each mapping table.

Referring for the moment between FIG. 4C and FIG. 6, in the context of FIG. 5, the controller 310 may select the first data block 410-1B including invalid pages as a victim block for garbage collection and determine validity for each of the pages 410-11 through 410-18 in the victim block 410-1B. Thus, the controller 310 reads a page included in a data block to acquire a logical page number (S111), reads a meta page in a meta block storing a mapping table for the logical page number to acquire the mapping table (S112), and checks the mapping table to determine the validity of the page (S113). In this regard, the controller 310 will perform operations S111 through S113 on all pages included in the victim data block and determine validity for all of the pages.

As shown in FIG. 6 with reference to FIG. 5, the controller 310 may acquire the logical page number LPN013 by reading the first page 410-11 of the first data block 410-1B in operation S111. The controller 310 may acquire the mapping table MTA by reading the first meta page 420-11 of the meta block 420-1 which stores the mapping table MTA for the logical page number LPN013 in operation S112.

The controller 310 may determine that the first page 410-11 is valid using the logical page number LPN013 and the physical page number PPN0 which are stored in the mapping table MTA in operation S113. Since the original data is stored in the first page 410-11 corresponding to the physical page number PPN0, the controller 310 can read the original data and thus determine that the first page 410-11 is valid.

The controller 310 may acquire the logical page number LPN055 by reading the second page 410-12 of the first data block 410-1B in operation S111. The controller 310 may acquire the mapping table MTA by reading the first meta page 420-11 of the meta block 420-1 which stores the mapping table MTA for the logical page number LPN055 in operation S112. The controller 310 may determine that the second page 410-12 is invalid using the logical page number LPN055 and the physical page number PPN272 which are stored in the mapping table MTA in operation S113. Although the data DATA2 is stored in the second page 410-12 corresponding to the physical page number PPN1, the data DATA2 has been moved from the second page 410-12 corresponding to the physical page number PPN1 to another page corresponding to the physical page number PPN272 according to updating. Since old data is stored in the second page 410-12, the controller 310 no longer reads the second page 410-12 storing the old data. Accordingly, the controller 310 determines that the second page 410-12 is invalid in operation S113.

The controller 310 may similarly determine that the third page 410-13 is invalid. Although the data DATA3 is stored in the third page 410-13 corresponding to the physical page number PPN2, the data DATA3 has been moved from the third page 410-13 corresponding to the physical page number PPN2 to another page corresponding to the physical page number PPN280 according to updating. Since old data is stored in the third page 410-13, the controller 310 no longer reads the third page 410-13 storing the old data. Accordingly, the controller 310 determines that the third page 410-13 is invalid.

The controller 310 may acquire the logical page number LPN321 by reading the fourth page 410-14 of the first data block 410-1B in operation S111. The controller 310 may acquire the mapping table MTD by reading the fourth meta page 420-14 of the meta block 420-1 which stores the mapping table MTD for the logical page number LPN321 in operation S112.

The controller 310 may determine that the fourth page 410-14 is invalid using the logical page number LPN321 and the physical page number PPN103 which are stored in the mapping table MTD in operation S113. Although the data DATA4 is stored in the fourth page 410-14 corresponding to the physical page number PPN3, the data DATA4 has been moved from the fourth page 410-14 corresponding to the physical page number PPN3 to another page corresponding to the physical page number PPN103 according to updating. Since old data is stored in the fourth page 410-14, the controller 310 no longer reads the fourth page 410-14 storing the old data. Accordingly, the controller 310 determines that the fourth page 410-14 is invalid in operation S113.

The controller 310 may determine the validity/invalidity for each of the pages 410-15 and 410-16 through a procedure the same as or similar to the procedure in which the controller 310 determines that the fourth page 410-14 is invalid. The controller 310 may determine that each of the pages 410-17 and 410-18 is valid through a procedure the same as or similar to the procedure in which the controller 310 determines that the first page 410-11 is valid.

When the controller 310 determines the validity of the pages 410-11 through 410-18 of the first data block 410-1B having relatively low locality, as shown in FIG. 5; a validity decision cost 'VDC' may be calculated using Equation 1:

$$VDC = NPR = NPAGE*2, \quad (1)$$

where 'NPR' is a number of page read operations, and 'NPAGE' is a total number of pages included in a data block.

In order to determine the validity of each of the pages included a data block having relatively low locality, the controller 310 must perform two (2) read operations on the NVM 400. For instance, the controller 310 performs a read operation on the first page 410-11 of the data block 410-1 and performs a read operation on the first meta page 420-11 of the meta block 420-1 in order to determine the validity of the first page 410-11 of the data block 410-1B.

However, when the data block 410-1B has relatively high locality, the first through third pages 410-11 through 410-13 of the data block 410-1B refer to the mapping table MTA and the fourth through eighth pages 410-14 through 410-18 of the data block 410-1B refer to the mapping table MTD.

Figure 8B:
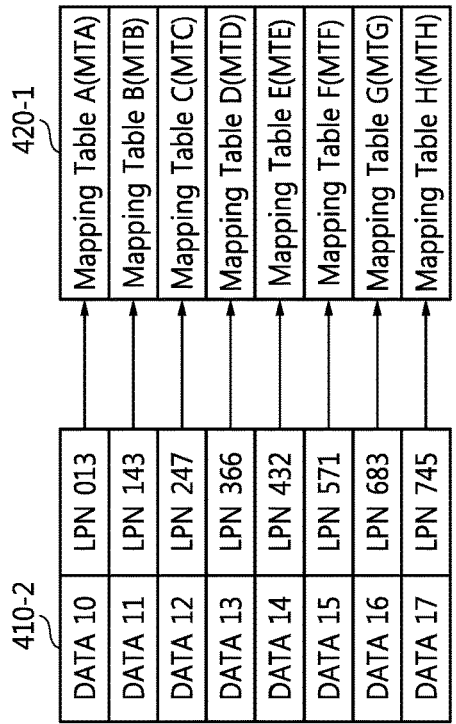
FIGS. 8A and 8B are diagrams for explaining locality of a data block according to some embodiments of the inventive concept.
Figure 8A:
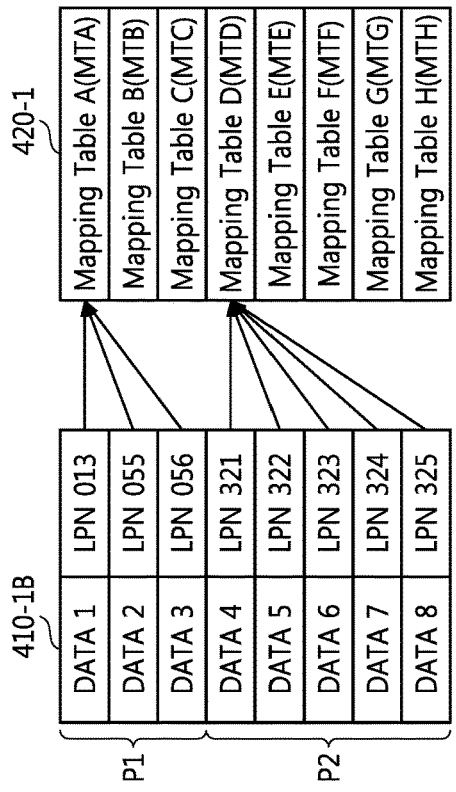
Figure 9:
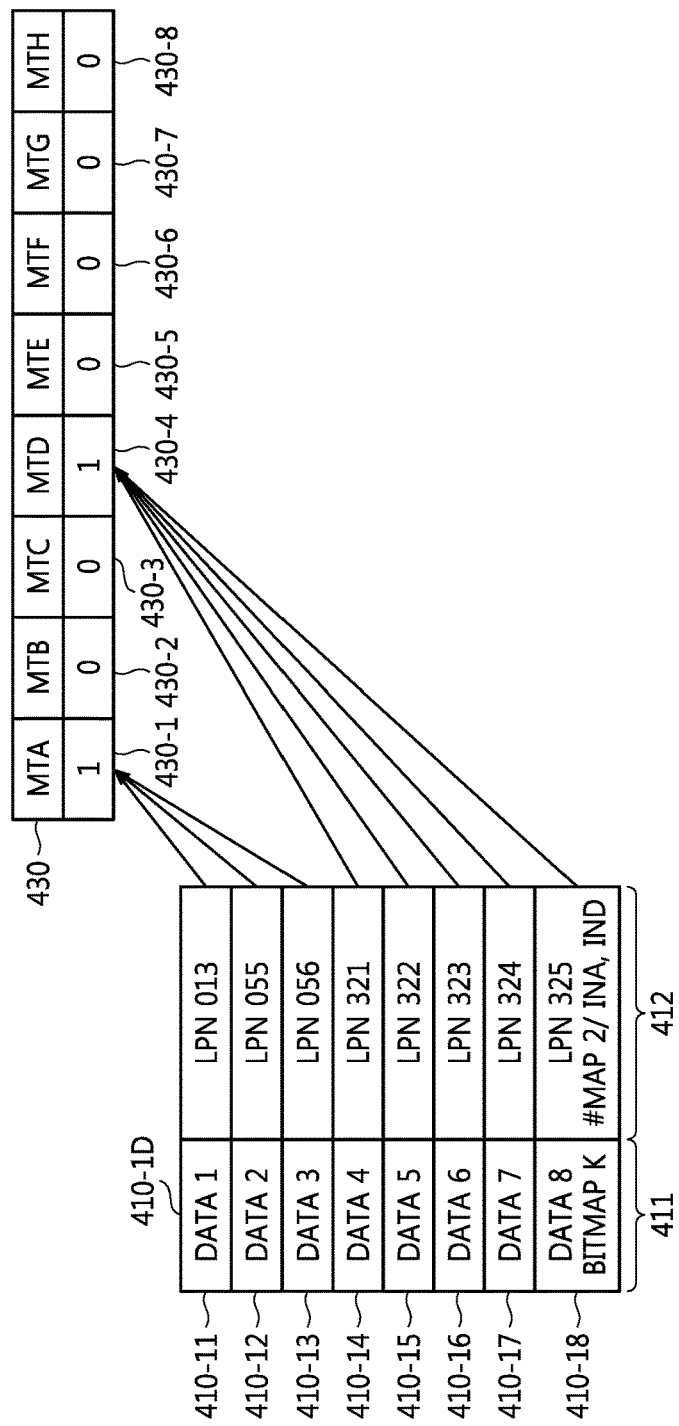
FIG. 9 is a diagram for explaining a method of managing locality information of a data block according to some embodiments of the inventive concept.

FIG. 7 is a flowchart summarizing a method of determining the validity for each of pages included in a data block having relatively high locality according to some embodiments of the inventive concept. FIGS. 8A and 8B are conceptual diagrams further illustrating the nature of locality of a data block according to some embodiments of the inventive concept. FIG. 9 is a conceptual diagram further illustrating a method of managing locality information for a data block according to some embodiments of the inventive concept.

FIG. 8A shows the first data block 410-1B having relatively high locality, as compared with FIG. 8B showing the second data block 410-2 having very low (or no) locality. Here, the term "locality" is used to describe circumstances wherein the logical page numbers corresponding to data written in a particular data block fall within a relatively narrow range. For instance, assuming that there are a total of 800 logical page numbers (e.g., LPN000 through LPN799) that are grouped in units (or ranges) of 100 logical page numbers, the 800 logical page numbers may be said to be divided into eight (8) ranges. The first range includes logical page numbers LPN000 through LPN099, the eighth range includes logical page numbers LPN700 through LPN799, etc.

Within this exemplary context, it is assumed that the logical page numbers LPN013, LPN055, and LPN056 of the first data block 410-1B form a first pattern P1 included in the first range, and the logical page numbers LPN321 through LPN325 of the first data block 410-1B form a second pattern P2 included in the fourth range. See, FIG. 8A. It is also assumed that the logical page numbers LPN013, LPN143, LPN247, LPN366, LPN432, LPN571, LPN683, and LPN745 of the second data block 410-2 are evenly distributed among the eight ranges. Compare, FIG. 8B.

In the first data block 410-1B, pages which respectively store the data DATA1 through DATA3 refer to the mapping table MTA which manages logical page numbers included in the first range, and pages which respectively store the data DATA4 through DATA8 refer to the mapping table MTD which manages logical page numbers included in the fourth range. This is one example of relatively high locality, wherein given group (or set) of pages commonly refer to the same mapping table among all pages included in one data block.

Extending this example, FIG. 9 illustrates an exemplary method of managing locality information for a data block according to some embodiments of the inventive concept.

The controller 310 may manage locality information for a data block 410-1D before determining the validity of the pages 410-11 through 410-18 of the data block 410-1D. Here, the locality information may be related to mapping table information. The mapping table information may include a number of mapping tables needed to determine the validity of the pages of a particular data block and/or index information of each mapping table.

Referring to FIG. 9, #MAP2 included in mapping table information regarding the data block 410-1D indicates that the number of mapping tables needed to determine the validity of the pages 410-11 through 410-18 is two (2). An index INA included in the mapping table information is an index of the mapping table MTA and an index IND included in the mapping table information is an index of the mapping table MTD.

Referring now to FIGS. 1, 7, 8A and 9, the controller 310 may generate a bitmap BITMAPK or 430 for managing mapping information regarding the pages 410-11 through 410-18 of the data block 410-1D (S121). The bitmap 430 may include a plurality of bits corresponding to the number of all mapping tables defined by the FTL 355. For instance, the bitmap 430 may include eight bits related to the eight mapping tables MTA through MTH. Each of the eight bits may be logic 1 or logic 0. For instance, when the bit related to the mapping table MTA is logic 1, it indicates that at least one of the pages 410-11 through 410-18 included in the data block 410-1D refers to the mapping table MTA. When the bit related to the mapping table MTB is logic 0, it indicates that none of the pages 410-11 through 410-18 included in the data block 410-1D refer to the mapping table MTB.

Each of the bits included in the bitmap 430 may be updated whenever data is written to at least one of the pages 410-11 through 410-18 included in the data block 410-1D (S122). For instance, when receiving a request to write the first data DATA1 corresponding to the logical page number LPN013 from the host 200, the controller 310 may write the first data DATA1 to the first page 410-11 of the first data block 410-1 and update the mapping table MTA related to the logical page number LPN013. The controller 310 may update or set a first bit 430-1 corresponding to the mapping table MTA in the bitmap 430 to logic 1 from logic 0.

When receiving a request to write the second data DATA2 corresponding to the logical page number LPN055 from the host 200, the controller 310 may write the second data DATA2 to the second page 410-12 of the first data block 410-1 and update the mapping table MTA related to the logical page number LPN055. The controller 310 may maintain logic 1 that has been set as the first bit 430-1.

When receiving a request to write the fourth data DATA4 corresponding to the logical page number LPN321 from the host 200, the controller 310 may write the fourth data DATA4 to the fourth page 410-14 of the first data block 410-1 and update the mapping table MTD related to the logical page number LPN321. The controller 310 may update or set a fourth bit 430-4 corresponding to the mapping table MTD in the bitmap 430 to logic 1 from logic 0.

Once data has been written to every page included in the data block 410-1D through a procedure the same as or similar to the one described above, the bitmap 430 includes the mapping table information of the data block 410-1D. Since the bits 430-1 and 430-4 are set to logic 1 in the bitmap 430, the number of mapping tables needed to determine the validity of the pages 410-11 through 410-18 included in the data block 410-1D is two and the indexes of respective two mapping tables are INA and IND.

The bitmap 430 and the mapping table information may be stored at least one of the pages 410-11 through 410-18 of the data block 410-1D (S123). For instance, the bitmap 430 may be stored in the main area 411 of the eighth page 410-18 and the mapping table information indicating the number of mapping tables and the index of each mapping table may be stored in the spare area 412 of the eighth page 410-18. The controller 310 may leave the eighth page 410-18 empty in order to store the bitmap 430 and the mapping table information in the eighth page 410-18. When receiving a request to write the eighth data DATA8, the controller 310 may store the bitmap 430 and/or the mapping table information in the eighth page 410-18 together with the eighth data DATA8.

FIG. 10 is a conceptual diagram of a memory map configured to store locality information for a data block according to some embodiments of the inventive concept. The data block 410-1D and the bitmap 430 illustrated in FIG. 9 are examples associated with a case wherein garbage collection is performed on every page of the data block 410-1D at the same time. However, when a large number of pages are included in a data block 410-1E, the controller 310 may divide the large number of pages into at least two page groups and may perform garbage collection on each page group.

For instance, when it is assumed that a first page group G1 includes the pages 410-11 through 410-14 and a second page group G2 includes the pages 410-15 through 410-18, as shown in FIG. 10; a first garbage collection may be performed on the pages 410-11 through 410-14 included in the first page group G1 and a second garbage collection may be performed on the pages 410-14 through 410-18 included in the second page group G2. The first garbage collection and second garbage collection may be performed sequentially or simultaneously (i.e., at least partially in parallel), but the inventive concept is not restricted to the current embodiments.

The controller 310 may generate a first bitmap and first mapping table information with respect to the first page group G1 and a second bitmap and second mapping table information with respect to the second page group G2. The first bitmap, the first mapping table information, the second bitmap, and the second mapping table information may be stored in one page or in different pages.

For instance, a first bitmap BITMAPX may be updated when data is written to at least one of the pages 410-11 through 410-14 included in the first page group G1. The first bitmap BITMAPX may include the first mapping table information regarding the first page group G1. The first bitmap BITMAPX and the first mapping table information may be stored in one page 410-14 among the pages 410-11 through 410-14 included in the first page group G1. Although the first bitmap BITMAPX and the first mapping table information are stored in one page 410-14 in the embodiments illustrated in FIG. 10, the first bitmap BITMAPX and the first mapping table information may be stored in among at least two of the pages 410-11 through 410-14 included in the first page group G1 in other embodiments.

A second bitmap BITMAPY may be updated when data is written to at least one of the pages 410-15 through 410-18 included in the second page group G2. The second bitmap BITMAPY may include the second mapping table information regarding the second page group G2. The second bitmap BITMAPY and the second mapping table information may be stored in one page 410-18 among the pages 410-15 through 410-18 included in the second page group G2. Although the second bitmap BITMAPY and the second mapping table information are stored in one page 410-18 in the embodiments illustrated in FIG. 10, the second bitmap BITMAPY and the second mapping table information may be stored in among at least two of the pages 410-15 through 410-18 included in the second page group G2 in other embodiments.

The controller 310 may manage locality information, i.e., mapping table information regarding the data block 410-1D or 410-1E. The controller 310 may determine the validity of the pages 410-11 through 410-18 included in the data block 410-1D or 410-1E using the mapping table information.

Referring back to FIGS. 6 and 9, the controller 310 may acquire mapping table information regarding the pages 410-11 through 410-18 of the data block 410-1D or 410-1E by reading the eighth page 410-18 which stores the mapping table information (S124). For instance, the controller 310 may read the bitmap BITMAPK stored in the main area 411 of the eighth page 410-18 illustrated in FIG. 9 and/or the mapping table information stored in the spare area 412 of the eighth page 410-18.

In case where only the bitmap BITMAPK is stored in the eighth page 410-18, the controller 310 may read and analyze the bitmap BITMAPK and may acquire the mapping table information based on the analysis result. In case where only the mapping table information is stored in the eighth page 410-18, the controller 310 may read only the mapping table information from the spare area 412. In case where both the bitmap BITMAPK and the mapping table information are stored in the eighth page 410-18, the controller 310 may read both the bitmap BITMAPK and the mapping table information or may read either the bitmap BITMAPK or the mapping table information.

Here, '#MAP2' indicates the number of mapping tables needed to determine the validity of the pages 410-11 through 410-18 included in the data block 410-1D is two (2), 'INA' is an index value for the mapping table MTA, and 'IND' is an index value for the mapping table MTD. Accordingly, the controller 310 may refer to the mapping table MTA or MTD using the index INA or IND.

The controller 310 may acquire at least one mapping table from the mapping table information regarding the pages 410-11 through 410-18 of the data block 410-1D in operation S125, may search the at least one mapping table for a physical page number assigned to each of the pages 410-11 through 410-18, and may determine a page having the searched physical page number as a valid page (S127).

As described above with reference to FIG. 6, the controller 310 may acquire the mapping table MTA by reading the first meta page 420-11 in the meta block 420-1 (S125) and may determine the validity of the pages 410-11 through 410-13, which determines locality by scanning the mapping table MTA. For instance, the controller 310 may search the mapping table MTA for a physical page number assigned to each of the pages 410-11 through 410-13 (S126) and may determine the first page 410-11 corresponding to the physical page number PPN0 as a valid page and the pages 410-12 and 410-13 corresponding to the respective physical page numbers PPN1 and PPN2 as invalid pages (S127).

Thereafter, the controller 310 may acquire the mapping table MTD by reading the fourth meta page 420-14 in the meta block 420-1 (S125) and may determine the validity of the pages 410-14 through 410-18, which determines locality, by scanning the mapping table MTD. For instance, the controller 310 may search the mapping table MTD for a physical page number assigned to each of the pages 410-14 through 410-18 (S126) and may determine the pages 410-17 and 410-18 corresponding to the respective physical page numbers PPN6 and PPN7 as valid pages and the pages 410-14 through 410-16 corresponding to the respective physical page numbers PPN3 through PPN5 as invalid pages (S127).

When the validity of each of the pages 410-11 through 410-18 included in the data block 410-1B or 410-1D is determined using the method described with reference to FIG. 7, the validity decision cost 'VDC' may be calculated using Equation 2:

$$VDC=NPR+A=(NOL+1)+A, \qquad (2)$$

wherein 'NOL' is a number of localities or a number of mapping tables that must be referenced, and 'A' is a cost needed to scan each of the mapping tables.

As described above with reference to FIG. 7, the number of read operations performed on the NVM 400 to determine the validity of all pages included in a data block may depend on the number of localities. For instance, in order to determine the validity of every page in the data block 410-1B or 410-1D, the controller 310 may read the eighth page 410-18 of the data block 410-1B or 410-1D, read the first page 420-11 of the meta block 420-1, and read the fourth page 420-14 of the meta block 420-1. In other words, the controller 310 may perform a total of three (3) read operations. The controller 310 reads the mapping tables MTA and MTD. In other words, the controller 310 may read two (2) mapping tables MTA and MTD and may scan each of the mapping tables MTA and MTD.

Figure 11:
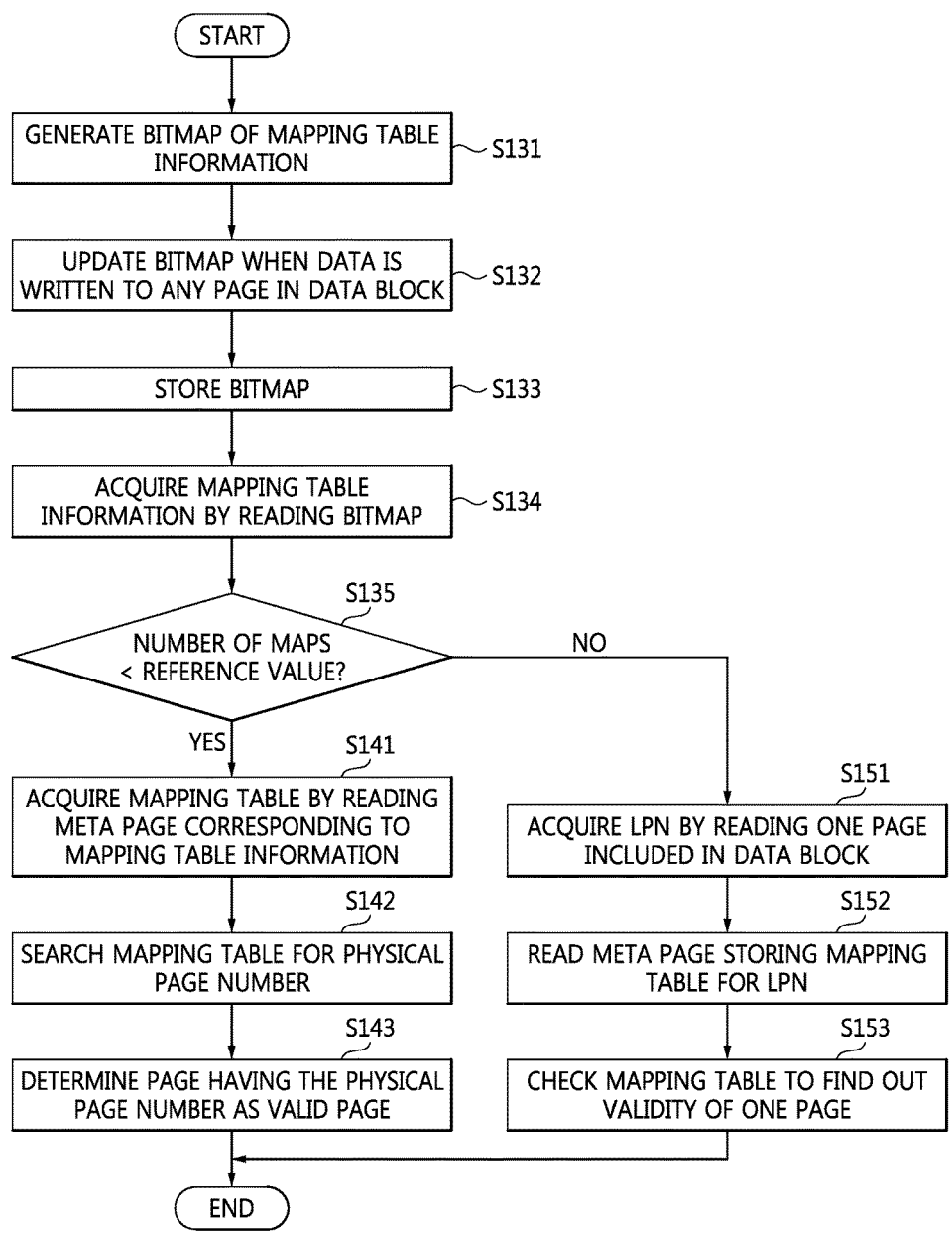
FIG. 11 is a flowchart summarizing a method of performing validity determination optimally on pages in a data block according to locality information according to some embodiments of the inventive concept.

FIG. 11 is a flowchart summarizing a method of selectively performing validity determinations on pages in a data block using locality information according to some embodiments of the inventive concept. Referring to FIGS. 1 through 11, the controller 310 may manage locality information (e.g., mapping table information) for the data block 410-1B or 410-1D before determining the validity of the pages 410-11 through 410-18 of the data block 410-1B or 410-1D.

In this regard, the controller 310 may generate the bitmap 430, as shown in FIG. 9, to manage mapping information regarding the pages 410-11 through 410-18 of the data block 410-1B or 410-1D (S131). When data is written to at least one of the pages 410-11 through 410-18 included in the data block 410-1B or 410-1D, the controller 310 may update the bitmap 430 (S132). The controller 310 may store mapping table information regarding the bitmap 430 in at least one of the pages 410-11 through 410-18 in the data block 410-1D (S133). Here, operations S131, S132 and S133 may be the same as or similar to the operations S121, S122, and 123 described in relation to FIG. 7. Thus, detailed descriptions of operations S131, S132 and S133 will be omitted. The controller 310 may mange the mapping table information regarding the data block 410-1B or 410-1D and may determine the validity of each of the pages 410-11 through 410-18 in the data block 410-1B or 410-1D using the mapping table information.

The controller 310 may acquire the mapping table information by reading the eighth page 410-18 which includes the mapping table information regarding the pages 410-11 through 410-18 of the data block 410-1B or 410-1D (S134). For instance, the controller 310 may read the bitmap 430 from the main area 411 of the eighth page 410-18, thereby acquiring information that the number of mapping tables needed to determine the validity of the pages 410-11 through 410-18 in the data block 410-1B or 410-1D is two and the indexes of the respective mapping tables are INA and IND. Alternatively, the controller 310 may directly acquire the number of mapping tables (e.g., #MAP2) and the indexes INA and IND from the spare area 412 of the eighth page 410-18.

The controller 310 may select a validity determining method for each of the pages 410-11 through 410-18 in the data block 410-1B or 410-1D based on the mapping table information. For instance, the controller 310 may compare the number of mapping tables with a reference value predefined by the FTL 355 (S135). When the number of mapping tables is less than the reference value, the controller 310 may perform the method illustrated in FIG. 7. When the number of mapping tables is greater than the reference value, the controller 310 may perform the method illustrated in FIG. 5.

That is, when the number of mapping tables for the data block 410-1B or 410-1D is less than the reference value, the controller 310 may acquire a mapping table from the mapping table information regarding each of the pages 410-11 through 410-18 in the data block 410-1B or 410-1D (S141), may search the mapping table for a physical page number assigned to each of the pages 410-11 through 410-18 in the data block 410-1B or 410-1D (S142), and may determine whether a page corresponding to the physical page number is a valid page or an invalid page (S143).

However, when the number of mapping tables is greater than the reference value, the controller 310 may acquire a logical page number by reading a page included in the data block 410-1B or 410-1D (S151), may acquire a mapping table by reading a meta page of the meta block 420-1 which stores the mapping table for the logical page number (S152), and may check the mapping table to find out the validity of the page (S153). Operations S151, S152 and S153 may be performed on every page included in the data block 410-1B or 410-1D to determine the validity of every page.

In this manner, the data storage device 300 may determine the relative locality of a data block with respect to an established reference, and may select an appropriate (or more optimal) method (e.g., the method illustrated in FIG. 5 or the method illustrated in FIG. 7) of determining the validity of pages included in the data block according to the locality determination using, for example, the method illustrated in FIG. 11. As a result, the data storage device 300 may reduce overall garbage collection cost.

Figure 12:
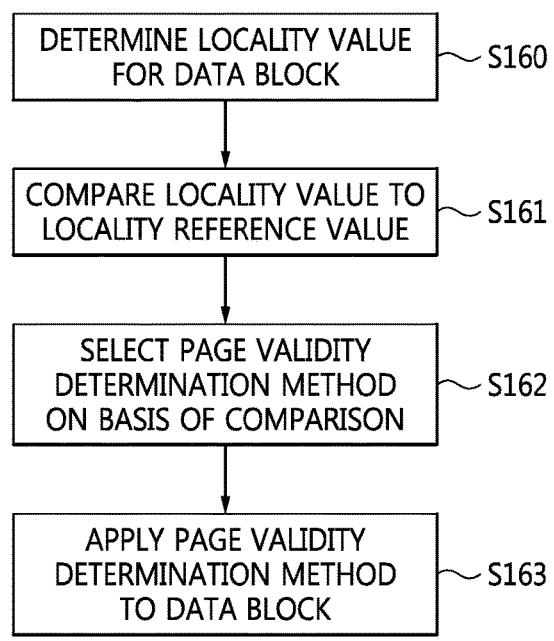
FIG. 12 is a flowchart summarizing a method of performing validity determination optimally on pages in a data block according to locality information according to some embodiments of the inventive concept.

FIG. 12 is a flowchart summarizing a method of determining page validity for a data block according to some embodiments of the inventive concept.

Here, the more specific approach summarized in FIG. 11 may be extrapolated into a general method. That is, various approaches may be used to determine a locality value for at least one data block (S160). This locality value may be variously expressed, such as by the number of mapping tables that must be referenced in determining the validity of all pages in the data block. However, other statistical representations for the valid pages, invalid pages, distribution of valid/invalid pages, location of valid/invalid pages, etc. may be used to generate a competent locality value for a data block.

However determined or expressed, the locality value for the data block may then be compared to an established locality reference value (S161). The locality reference value will vary in its nature and expression with the approach used to define the data block locality value.

The comparison result between the determined locality value and locality reference value may then be used to select one of a plurality of page validity/invalidity determination methods (S162). As has been illustrated above, more than one approach to the determination of page validity/invalidity for pages in a data block may be more or less appropriately used, depending on the locality characteristic of the data block. Two exemplary methods have been described with respect to FIGS. 5 and 7, however other methods may be formulated in relation to lower or higher degrees of data locality.

Finally, the selected method of determining page validity/invalidity may be applied to the data block (S163).

As described above, according to some embodiments of the inventive concept, better optimized garbage collection may be provided by defining, deriving and referencing locality information for at least one data block in a data storage device characterized by relatively limited resources. In this manner performance of the data storage device may be preserved or improved.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A method of operating a data storage device, the method comprising:
   acquiring mapping table information including mapping tables associated with a plurality of pages of a data block; and
   determining validity for each page among the plurality of pages by detecting a number of the mapping tables, comparing the number of mapping tables with a reference value to generate a comparison result, and determining the validity for each page among the plurality of pages based on the comparison result.

2. The method of claim 1, wherein the mapping table information comprises an index value for at least one of the mapping tables.

3. The method of claim 1, wherein the mapping table information is stored in at least one of the plurality of pages.

4. The method of claim 3, wherein the mapping table information is stored in a spare area of the least one of the plurality of pages.

5. The method of claim 1, wherein the acquiring of the mapping table information comprises reading a bitmap, the bitmap being stored in at least one of the plurality of pages.

6. The method of claim 5, wherein the bitmap is updated whenever data is written to any one of the plurality of pages.

7. A method of operating a data storage device including a data block storing a plurality of pages divided into a first page group and a second page group, the method comprising:
   acquiring mapping table information including a first mapping table for the first page group and a second mapping table for the second page group;

performing garbage collection for the first page group by determining validity for each page of the first page group with reference to the first mapping table, and separately performing garbage collection for the second page group by determining validity for each page of the second page group with reference to the second mapping table.

8. The method of claim 7, wherein the determining of the validity for each page of the first page group comprises:
acquiring the first mapping tables by reading a meta page storing the mapping table information;
detecting a physical page number assigned to each page of the first page group with reference to the first mapping table; and
determining whether each page having the detected physical page number among the pages of the first page group is a valid page.

9. The method of claim 8, wherein the determining of the validity for each page of the second page group comprises:
acquiring the second mapping tables by reading a meta page storing the mapping table information;
detecting a physical page number assigned to each page of the second page group with reference to the second mapping table; and
determining whether each page having the detected physical page number among the pages of the second page group is a valid page.

10. The method of claim 7, further comprising:
moving data of a valid page of the first page group to another data block based on the determining of the validity.

11. The method of claim 7, further comprising:
receiving a command from a host to perform garbage collection on the data block; and
performing garbage collection for the first page group and separately performing garbage collection for the second page group in response to the command.

12. The method of claim 7, wherein the mapping table information further includes index value for at least one of the first and second mapping tables.

13. The method of claim 7, wherein the mapping table information is stored in at least one of the plurality of pages.

14. The method of claim 13, wherein the at least one of the plurality of pages stores meta data.

15. The method of claim 7, further comprising:
during the garbage collection for the first page group, moving data from at least one page of the first page group determined to be valid to another data block before erasing the data block; and
during the garbage collection for the second page group, moving data from at least one page of the second page group determined to be valid to the another data block before erasing the data block.

16. A method of operating a data processing system including a data storage device including a memory cell array, the method comprising:
determining a locality value for a data block of the memory cell array, wherein the data block includes a plurality of pages;
comparing the locality value of the data block to a locality reference value to generate a comparison result;
selecting a page validity determination method from a plurality of page validity determination methods in response to the comparison result; and
using the selected page validity determination method to determine the validity of each one of the plurality of pages.

17. The method of claim 16, wherein plurality of page validity determination methods comprises a first page validity determination method that acquires mapping table information by reading a meta page of the data block, searches a mapping table indicated by the mapping table information for a physical page number, and determines whether a page among the plurality of pages is a valid page using the physical page number.

18. The method of claim 16, wherein plurality of page validity determination methods comprises a second page validity determination method that, for each one of the plurality of pages, acquires a logical page number for the page, reads a meta page storing a mapping table for the logical page number, and determines the validity of the page by referencing the mapping table.

19. The method of claim 16, wherein the locality value indicates a first number of mapping tables associated with the plurality of pages and the locality reference value indicates a second number of mapping tables.

20. The method of claim 19, wherein the first number of mapping tables is derived by referencing a bitmap for mapping table information related to mapping tables associated with the plurality of pages.

* * * * *